US012701445B2

(12) United States Patent
Oh et al.

(10) Patent No.: US 12,701,445 B2
(45) Date of Patent: Aug. 4, 2026

(54) METHOD AND DEVICE FOR PREVENTING FALSE PMI REPORT IN WIRELESS COMMUNICATION SYSTEM

(71) Applicant: SAMSUNG ELECTRONICS CO., LTD., Suwon-si (KR)

(72) Inventors: Jinwoo Oh, Suwon-si (KR); Hongsik Yoon, Suwon-si (KR); Junho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 18/186,580

(22) Filed: Mar. 20, 2023

(65) Prior Publication Data

US 2023/0300646 A1     Sep. 21, 2023

(30) Foreign Application Priority Data

Mar. 21, 2022   (KR) ........................ 10-2022-0034940
Aug. 19, 2022   (KR) ........................ 10-2022-0104331

(51) Int. Cl.
  *H04W 24/08*       (2009.01)
  *H04B 7/06*        (2006.01)

(52) U.S. Cl.
  CPC .......... *H04W 24/08* (2013.01); *H04B 7/0632* (2013.01); *H04B 7/0639* (2013.01)

(58) Field of Classification Search
  CPC ... H04W 24/08; H04B 7/0632; H04B 7/0639; H04B 7/0456; H04B 7/086; H04L 25/0204; H04L 25/0224
  See application file for complete search history.

(56) References Cited

U.S. PATENT DOCUMENTS 8,711,716 B2    4/2014  Chen et al.
2010/0034175 A1*  2/2010  Xiao ..................... H04W 28/18
                                          370/335
(Continued)

FOREIGN PATENT DOCUMENTS

EP        3291457       3/2018
EP        3955638       2/2022
(Continued)

OTHER PUBLICATIONS

Ericsson, "Discussion on UE demodulation and CSI requirement for FeMIMO", 3GPP TSG-RAN WG4 Meeting #101-bis-e, R4-2201421, Electronic meeting, Jan. 17-25, 2022, 13 pages.
(Continued)

*Primary Examiner* — Nicholas A Jensen
*Assistant Examiner* — Ayodele Lawrence Olubodun
(74) *Attorney, Agent, or Firm* — Morgan, Lewis & Bockius LLP

(57)     ABSTRACT

A wireless communication device includes a communication circuit configured to receive a channel state information reference signal (CSI-RS), a processor, which includes an angle of departure (AoD) monitoring circuit configured to extract AoD values corresponding to the received CSI-RS and an interference cancellation circuit configured to cancel second AoD values corresponding to an interfering cell adjacent to a serving cell other than first AoD values corresponding to the serving cell among the AoD values, and a memory storing the first AoD values corresponding to the serving cell and antenna array information of the serving cell.

20 Claims, 10 Drawing Sheets

(56) References Cited

U.S. PATENT DOCUMENTS

| | | | | |
|---|---|---|---|---|
| 2012/0258729 A1* | 10/2012 | Siomina | ................... | G01S 5/08 |
| | | | | 455/456.1 |
| 2012/0300867 A1* | 11/2012 | Chen | ................... | H04B 7/0456 |
| | | | | 375/267 |
| 2013/0315189 A1* | 11/2013 | Kim | ..................... | H04L 1/0026 |
| | | | | 370/328 |
| 2013/0315329 A1* | 11/2013 | Zhou | ................... | H04B 7/0486 |
| | | | | 375/267 |
| 2019/0296805 A1* | 9/2019 | Son | ...................... | H04W 76/27 |
| 2019/0341976 A1* | 11/2019 | Nam | ................... | H04B 7/0456 |
| 2020/0274606 A1 | 8/2020 | Kang et al. | | |
| 2021/0075484 A1* | 3/2021 | Jamin | ................ | H04B 7/0456 |
| 2021/0091838 A1* | 3/2021 | Bai | ...................... | H04B 7/0639 |
| 2021/0126692 A1* | 4/2021 | Chung | ................ | H04B 7/0626 |
| 2021/0344400 A1* | 11/2021 | Gupta | .............. | H04L 25/03891 |
| 2022/0053342 A1* | 2/2022 | Kim | ..................... | H04W 16/28 |
| 2022/0094491 A1 | 3/2022 | Choi et al. | | |
| 2022/0123797 A1* | 4/2022 | Files | ................... | H04B 7/0456 |
| 2023/0232249 A1* | 7/2023 | Kim | ..................... | H04B 17/336 |
| | | | | 370/329 |

FOREIGN PATENT DOCUMENTS

| | | |
|---|---|---|
| KR | 10-2148652 | 8/2020 |
| WO | 2018201495 | 11/2018 |
| WO | 2020158977 | 8/2020 |
| WO | 2020-192790 | 10/2020 |
| WO | 2022-028713 | 2/2022 |

OTHER PUBLICATIONS

Extended European Search Report dated Aug. 3, 2023 in corresponding European Patent Application No. 23163258.9 (13 pages).
Koc, et al., "Full-Duplex mmWave Massive MIMO Systems: A Joint Hybrid Precoding/Combining and Self-Interference Cancellation Design", IEEE Open Journal of the Communications Society, vol. 2, Mar. 30, 2021, pp. 754-774.

* cited by examiner

OBTAIN ANTENNA ARRAY INFORMATION OF SERVING CELL —— S710

GENERATE ARRAY RESPONSE VECTOR, BASED ON ANTENNA ARRAY INFORMATION OF SERVING CELL —— S720

PERFORM CORRELATION ANALYSIS BETWEEN GENERATED ARRAY RESPONSE VECTOR AND ESTIMATED CHANNEL —— S730

OBTAIN AoD VALUES FOR CSI-RS BY PERFORMING DECOMPOSITION INTO AoD DOMAIN —— S740

S520

METHOD AND DEVICE FOR PREVENTING FALSE PMI REPORT IN WIRELESS COMMUNICATION SYSTEM

CROSS-REFERENCE TO RELATED APPLICATION

This application is based on and claims priority to and benefit under 35 U.S.C. § 119 to Korean Patent Application No. 10-2022-0034940, filed on Mar. 21, 2022, and Korean Patent Application No. 10-2022-0104331, filed on Aug. 19, 2022, in the Korean Intellectual Property Office, the disclosures of which are incorporated by reference herein in their entirety.

BACKGROUND

The present disclosure describes a method and device for transmitting a precoding matrix indicator (PMI) report, and in some embodiments, a method and device for preventing a false PMI report in a wireless communication system.

The demand for wireless data traffic has increased since the commercialization of 4-th generation (4G) communication systems. As a result, improved 5-th generation (5G) communication systems or pre-5G communication systems referred to as new radio (NR) systems in 3GPP standards are being developed.

The implementation of 5G communication systems in ultra-high frequency (mmWave) bands (for example, 28 GHz bands or 39 GHz bands) is considered to achieve high data transfer rates. In some cases, techniques such as beamforming, massive multiple-input multiple-output (MIMO), full dimensional MIMO (FD-MIMO), array antenna, analog beamforming, hybrid beamforming, and large scale antenna are used with respect to 5G communication systems. Such techniques may be used to reduce path loss of radio waves and increase the transmission distance of radio waves in ultra-high frequency bands.

SUMMARY

The present disclosure describes a method and system for wireless communication. Embodiments of the present disclosure include an electronic device for monitoring an angle of departure (AoD) of a serving cell. In some cases, the device selects a precoding matrix indicator (PMI) except for a channel state information reference signal (CSI-RS) received through a different AoD instead of the monitored AoD.

According to an aspect of the present disclosure, a wireless communication device including a communication circuit, a processor, and a memory is provided. The communication circuit may be configured to receive a CSI-RS. The processor includes an AoD monitoring circuit and an interference cancellation circuit. The AoD monitoring circuit is configured to extract AoD values corresponding to the received CSI-RS. The interference cancellation circuit is configured to cancel second AoD values corresponding to an interfering cell adjacent to the serving cell. The interference cancellation circuit may cancel values other than first AoD values corresponding to the serving cell among the AoD values. The memory in the wireless communication device stores the first AoD values corresponding to the serving cell and antenna array information of the serving cell.

According to another aspect of the present disclosure, a method of operating a wireless communication device is provided. The method includes receiving a CSI-RS, extracting AoD values corresponding to the received CSI-RS, and classifying the AoD values into first AoD values corresponding to the serving cell and second AoD values corresponding to an interfering cell adjacent to the serving cell.

According to an aspect of the present disclosure, a wireless communication system is provided that includes a serving cell configured to transmit a first CSI-RS and antenna array information, an interfering cell configured to transmit a second CSI-RS, and a wireless communication device configured to receive the first CSI-RS and the second CSI-RS. The wireless communication device includes a communication circuit, a processor, and a memory. The communication circuit is configured to receive a CSI-RS including the first CSI-RS and the second CSI-RS. The processor is configured to extract AoD values corresponding to the received CSI-RS and classify the AoD values into first AoD values corresponding to the serving cell and second AoD values corresponding to the interfering cell. The memory stores the first AoD values corresponding to the serving cell and the antenna array information of the serving cell.

According to an aspect of the present disclosure, a wireless communication system is provided that receives a first CSI-RS from a serving cell and a second CSI-RS from an interfering cell. The processor computes first AoD values based on the first CSI-RS and second AoD values based on the second CSI-RS. Additionally, the processor communicates with the serving cell based on the first AoD values and a determination that the second AoD values correspond to the interfering cell.

Other features and aspects will be apparent from the following detailed description, the drawings, and the claims.

BRIEF DESCRIPTION OF THE DRAWINGS

Embodiments of the present disclosure can be understood from the following detailed description taken in conjunction with the accompanying drawings:

FIG. 4B illustrates an example of a detailed configuration of the communication circuit of FIG. 3;

DETAILED DESCRIPTION

Figure 1:
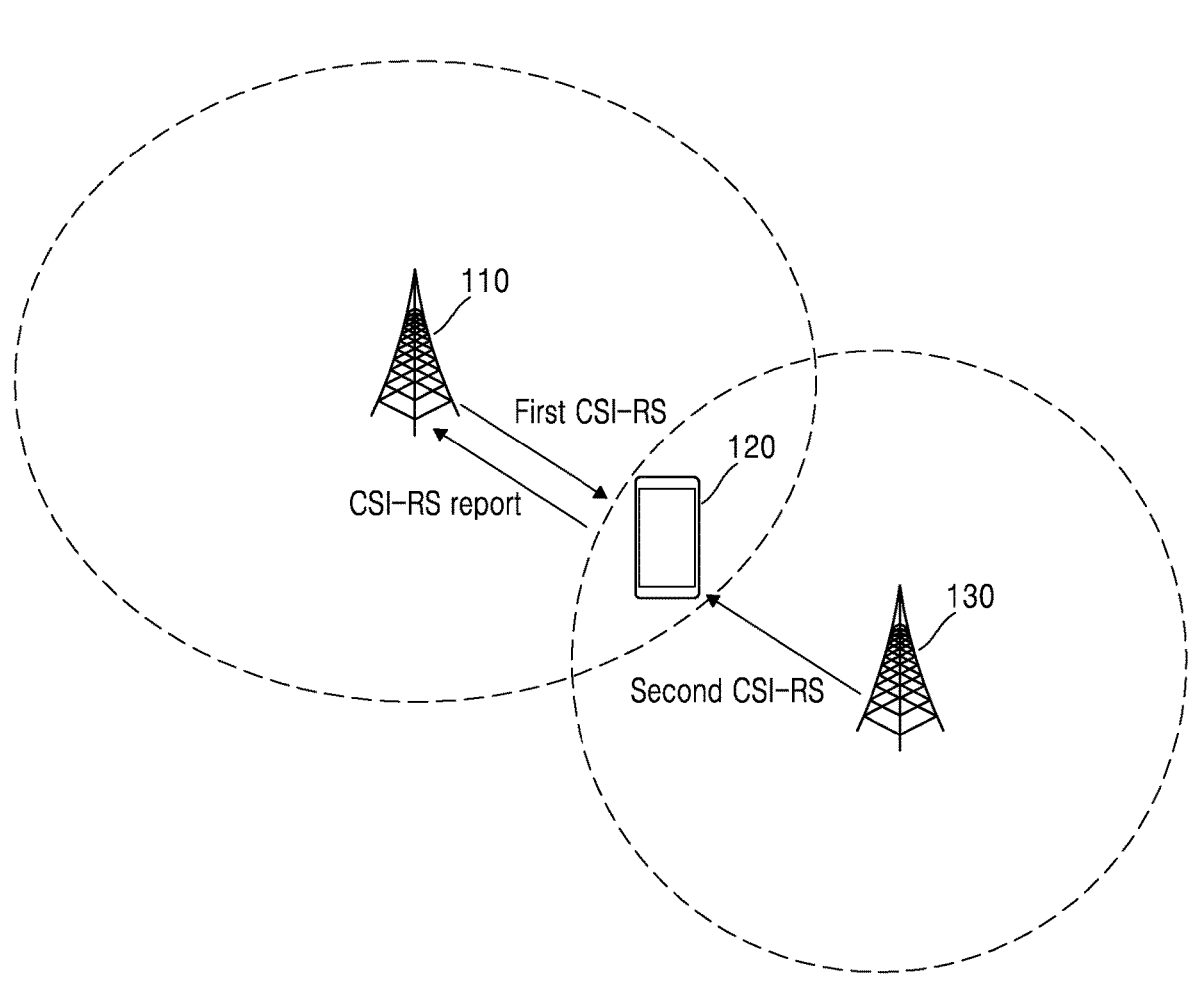
FIG. 1 illustrates a wireless communication system according to an embodiment.

The present disclosure relates to wireless communication systems. Embodiments of the present disclosure include an electronic device for monitoring an angle of departure (AoD) of a serving cell. In some cases, the device selects a precoding matrix indicator (PMI) except for a channel state information reference signal (CSI-RS) received through a different AoD instead of the monitored AoD.

Conventional electronic devices may enter an edge region of the coverage of a serving cell. In such cases, the conventional electronic devices may receive a CSI-RS of an interfering cell and a CSI-RS of a serving cell. As a result, the electronic device may select a PMI directing towards an interfering cell which adversely affects the PMI information that is reported to a base station.

Accordingly, embodiments of the present disclosure include an electronic device configured to track and store AoD values of a serving cell and extract AoD values of a received CSI-RS. In some cases, the electronic device removes the AoD values which do not correspond to the stored AoD values when the AoD values of the received CSI-RS include AoD values that are not the stored AoD values. The electronic device removes the AoD values by regarding those AoD values as a CSI-RS of an interfering cell, and calculates an effective channel with respect to the serving cell. Therefore, effects of the CSI-RS transmitted from the interfering cell may be removed, and PMI information optimized for the serving cell may be reported to a base station.

Embodiments of the present disclosure include a wireless communication device comprising a communication circuit, a processor, and a memory. The communication circuit is configured to receive a CSI-RS. The processor further comprises an angle of departure (AoD) monitoring circuit and an interference cancellation circuit. The AoD monitoring circuit is configured to extract AoD values corresponding to the received CSI-RS and the interference cancellation circuit being configured to cancel second AoD values. In some cases, the second AoD values correspond to an interfering cell adjacent to a serving cell, other than first AoD values corresponding to the serving cell among the AoD values. The memory stores the first AoD values corresponding to the serving cell and antenna array information of the serving cell. Therefore, by removing AoD values that are considered CSI-RS of an interfering cell, effects of the CSI-RS from the interfering cell can be removed and a PMI directed towards an interfering cell is not selected resulting in an efficient wireless communication system.

According to an aspect of the present disclosure, a wireless communication system is provided that receives a first CSI-RS from a serving cell and a second CSI-RS from an interfering cell. The processor computes first AoD values based on the first CSI-RS and second AoD values based on the second CSI-RS. Additionally, the processor communicates with the serving cell based on the first AoD values and a determination that the second AoD values correspond to the interfering cell.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application.

The present disclosure may be modified in multiple alternate forms, and thus specific embodiments will be exemplified in the drawings and described in detail. In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Like reference numerals may refer to like components throughout the specification and the drawings. It is noted that while the drawings are intended to illustrate actual relative dimensions of a particular embodiment of the specification, the present disclosure is not necessarily limited to the embodiments shown. The term "and/or" includes all combinations of one or more of which associated configurations may define.

It will be understood that, although the terms "first," "second," etc. may be used herein to describe various components, these components should not necessarily be limited by these terms. These terms are only used to distinguish one component from another. For example, a first component could be termed a second component, and, similarly, a second component could be termed a first component, without departing from the scope of the inventive concept. The terms of a singular form may include plural forms unless the context clearly indicates otherwise.

Additionally, terms such as "below," "under," "on," and "above" may be used to describe the relationship between components illustrated in the figures. The terms are used as a relative concept and are described with reference to the direction indicated in the drawings. It should be understood that the terms "comprise," "include," or "have" are intended to specify the presence of stated features, integers, steps, operations, components, parts, or combinations thereof in the disclosure, but do not preclude the presence or addition of one or more other features, integers, steps, operations, components, parts, or combinations thereof.

Embodiments of the present disclosure include a new radio (NR) network-based carrier service. For example, the carrier service may be a wholesale carrier service (WCS), particularly the 3GPP release. However, the present disclosure is not limited to the NR network and may be applied to other wireless communication systems having a similar technical background or channel configuration.

Hereinafter, a wireless communication system of an embodiment of the present disclosure will be described in detail with reference to the accompanying drawings, wherein an electronic device tracks and store AoD values of a serving cell and a received CSI-RS of an interfering cell to identify an effective channel with respect to the serving cell.

FIG. 1 illustrates a wireless communication system according to some embodiments.

Referring to FIG. 1, the wireless communication system may include wireless communication device 120, serving base station 110, and interfering base station 130. Hereinafter, the wireless communication device 120 may be referred to as user equipment (UE) 120, serving base station 110 may be referred to as serving cell 110, and interfering base station 130 may be referred to as interfering cell 130.

Although the wireless communication system is shown as including the serving cell 110, the interfering cell 130, and one UE 120 for convenience of description, the inventive concept is not limited thereto. According to some embodiments, the wireless communication system may include a plurality of base stations and a plurality of UEs.

A base station (BS) may be a station that communicates with UE. Each base station may provide communication coverage for a particular geographic area. In 3GPP, the term "cell" can refer to a coverage area of the base station and/or a coverage area depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network through various types of backhaul interfaces such as a direct physical connection, a virtual network, or the like using any suitable transport network. Base station may provide wireless broadband access to user equipment within coverage thereof.

User equipment may be mobile and may refer to any devices capable of communicating with base station to transmit and receive data and/or control information. For example, user equipment may be referred to as a terminal, terminal equipment, a mobile station (MS), a mobile terminal (MT), a user terminal (UT), a subscriber station (SS), a wireless device, a handheld device, and the like.

Serving cell 110 may be connected to UE 120 via a wireless channel and thus provide various communication services. Serving cell 110 may provide a service with respect to user traffic through a shared channel and may perform scheduling by collecting state information. In some examples, state information may include a buffer state, an available transmission power state, and a channel state, of UE 120. The wireless communication system may support beamforming technology by using orthogonal frequency division multiplexing (OFDM) as a wireless access technique. In addition, the wireless communication system may transmit and receive signals by using a broad frequency band that is present in 6 GHz or higher frequency bands. For example, the wireless communication system may improve a data transfer rate by using a millimeter wave band, such as a 28 GHz band or a 60 GHz band. The wireless communication system may support transmission and reception that are based on a directional beam generated using multiple antennas to secure coverage since the magnitude of signal attenuation per distance is relatively large in a millimeter wave band.

Beamforming refers to a technique in signal processing that is used for directional signal transmission or reception. In some cases, beamforming can be performed by combining elements in an antenna array such that signals at particular angles experience constructive interference and the remaining signals experience destructive interference. Beamforming can be performed at the transmitting and receiving sides to control the phase and relative amplitude of the signal at each transmitter. Accordingly, a pattern of constructive and destructive interference is achieved in the wavefront resulting in spatial selectivity.

The wireless communication system may be a system supporting Multiple-Input Multiple-Output (MIMO), and thus, serving cell 110 and UE 120 may support the beamforming technology. The beamforming technology may be classified as digital beamforming, analog beamforming, hybrid beamforming, and the like.

Referring to FIG. 1, serving cell 110 may transmit a first channel state information reference signal (CSI-RS) to UE 120. For example, a UE can receive a CSI-RS and the CSI-RS can be a first CSI-RS from first cell or the serving cell. The UE may estimate a wireless channel between the serving cell and the UE by using the CSI-RS. The UE may generate CSI feedback information including at least one of a rank indicator (RI), a precoding matrix indicator (PMI), and a channel quality indicator (CQI), based on a result of the channel estimation. UE 120 may transmit a CSI report including the CSI feedback information to serving cell 110.

In some cases, a communication device may perform channel estimation by generating CSI, which refers to information describing the channel properties of a communication link. For example, the CSI may be determined by analyzing a reference signal of the transmitter. In some cases, CSI may describe how a signal propagates from the transmitter to the receiver and may represent the combined effects of, for example, scattering, fading, and power decay. After generating the CSI, the information may be used to adapt transmission and reception procedures to current channel conditions. This may result in improving the rate and reliability of communication, especially in multiantenna systems. In some cases, CSI is estimated at a receiver which provides feedback to the transmitter (although reverse-link estimation is also possible). In some cases, the transmitter and receiver can have different CSI.

According to an embodiment of the present disclosure, interfering cell 130 may transmit a second CSI-RS to UE 120. For example, a UE can receive a CSI-RS and the CSI-RS can be a second CSI-RS from second cell or the interfering cell. Here, a resource, which is allocated to the transmission of a CSI-RS by interfering cell 130, may be identical to a resource, which is allocated to the transmission of a CSI-RS by serving cell 110. For example, a pseudo-random sequence may not properly function when a resource for transmitting a CSI-RS is insufficient. Accordingly, an interference channel due to the interfering cell is not spatially whitened since the pseudo-random sequence does not function properly and the UE may recognize the interference channel and thus receive the second CSI-RS as an interference signal.

Figure 2:
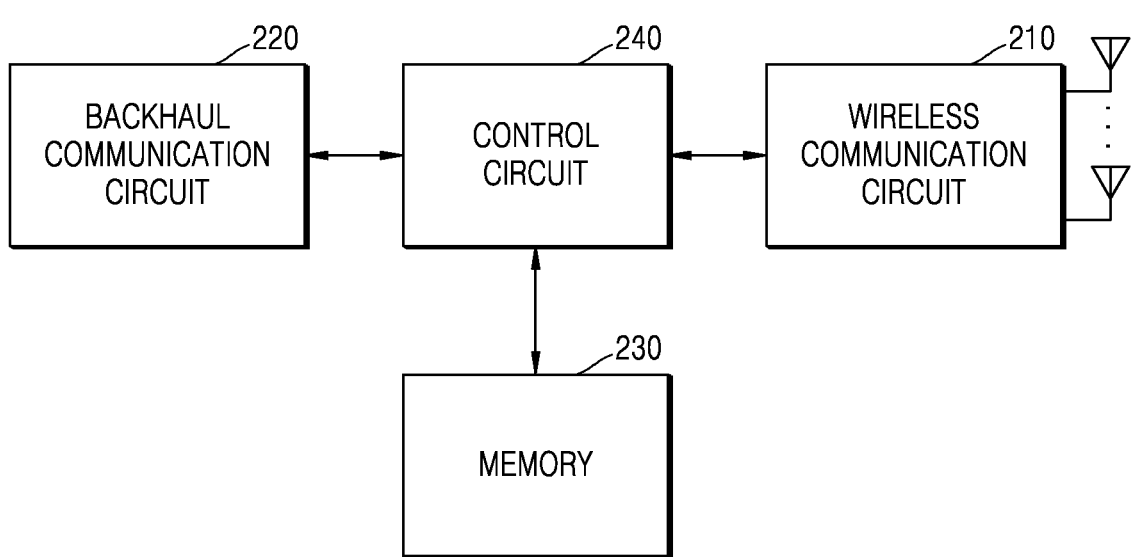
FIG. 2 is a block diagram of a base station according to some embodiments.

FIG. 2 is a block diagram of a serving base station according to some embodiments.

Referring to FIG. 2, the serving base station may include wireless communication circuit 210, backhaul communication circuit 220, memory 230, and control circuit 240.

Wireless communication circuit 210 may perform functions for transmitting and receiving signals through a wireless channel. According to an embodiment, the wireless communication circuit 210 may perform a function of conversion between a baseband signal and a bit string according to a physical layer specification of a system. For example, the wireless communication circuit may generate complex symbols by encoding and modulating a transmission bit string, during data transmission, and may restore a reception bit string by demodulating and decoding the baseband signal, during data reception. In addition, the wireless communication circuit 210 may up-convert a baseband signal into a radio frequency (RF)-band signal and then transmit the RF-band signal through an antenna or may down-convert the RF-band signal received through the antenna into the baseband signal. Accordingly, wireless communication circuit 210 may include a transmission filter, a reception filter, an amplifier, a mixer, an oscillator, a digital-to-analog converter (DAC), an analog-to-digital converter (ADC), and the like.

Wireless communication circuit 210 may transmit and receive signals. For example, the wireless communication circuit may transmit a synchronization signal, a reference signal, system information, a message, control information, data, or the like. In addition, the wireless communication circuit may perform beamforming. The wireless communication circuit may apply beamforming weights to the signals to provide directionality to signals intended to be transmitted and received. The wireless communication circuit may repeatedly transmit a signal by changing a beam that is formed.

Backhaul communication circuit 220 provides an interface for performing communication with other nodes in a network. Thus, the backhaul communication circuit may convert, into a physical signal, a bit string transmitted from serving base station 110 to another node, for example, another access node, another base station, an upper node, a core network, or the like, and may convert a physical signal received from another node into a bit string.

Memory 230 stores basic programs for operating serving base station 110, application programs, and data, such as configuration information. The memory may include volatile memory, nonvolatile memory, or a combination of volatile memory and nonvolatile memory. For example, the memory may store antenna array information corresponding to information about a panel structure, the number of operating panels, and the like of interfering base station 130 that is adjacent to serving base station 110.

Memory 230 refers to memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Control circuit 240 controls operations of serving base station 110. For example, the control circuit transmits and receives signals through wireless communication circuit 210 or backhaul communication circuit 220. In addition, the control circuit writes data to and read data from memory 230. Accordingly, the control circuit 240 may include at least one processor.

Processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing FIG. 3 is a block diagram of the UE 120 according to some embodiments.

Figure 3:
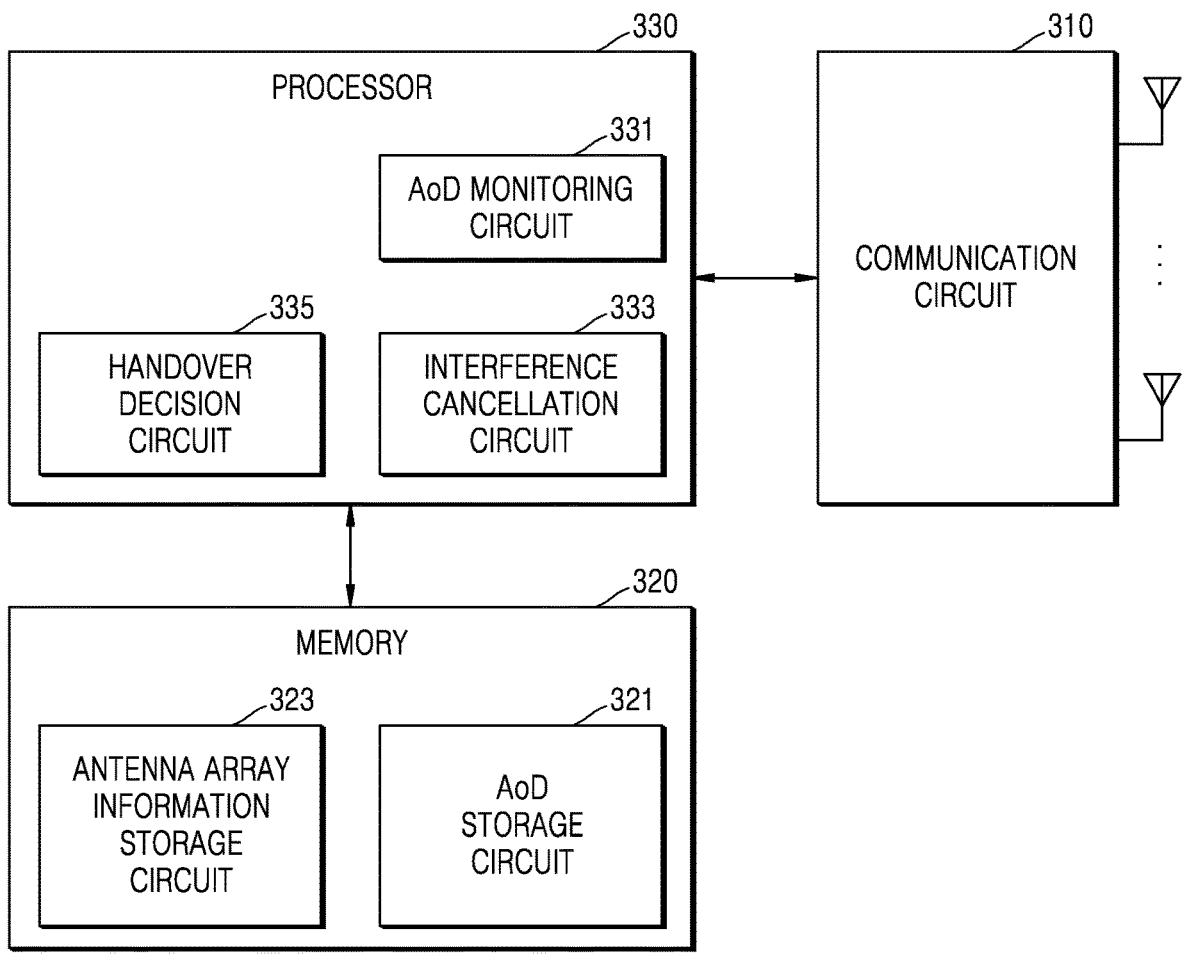
FIG. 3 is a block diagram of an electronic device according to some embodiments.

Referring to FIG. 3, UE 120 may include communication circuit 310, memory 320, and processor 330.

Communication circuit 310 performs functions for transmitting and receiving signals through a wireless channel. For example, the communication circuit performs a function of conversion between a baseband signal and a bit string according to a physical layer specification of a system. For example, the communication circuit may generate complex symbols by encoding and modulating a transmission bit string during data transmission. Additionally, the communication circuit may restore a reception bit string by demodulating and decoding the baseband signal during data reception.

Communication circuit 310 may up-convert a baseband signal into an RF-band signal and then transmit the RF-band signal through an antenna or may down-convert the RF-band signal received through the antenna into the baseband signal. For example, the communication circuit 310 may include a transmission filter, a reception filter, an amplifier, a mixer, an oscillator, a DAC, an ADC, and the like. The communication circuit may perform beamforming. The communication circuit may apply beamforming weights to the signals to provide directionality to signals intended to be transmitted and received.

An antenna refers to a wireless device that may include a single antenna or more than one antenna. For example, the antenna may be capable of concurrently transmitting or receiving multiple wireless transmissions. In some cases, a wireless communication device may include an antenna array.

Communication circuit 310 may transmit and receive signals. The communication circuit may receive a downlink signal. The downlink signal may include a synchronization signal, a reference signal, system information, a configuration message, control information, downlink data, or the like. For example, UE 120 may receive a CSI-RS from serving cell 110. In addition, the communication circuit may transmit an uplink signal. The uplink signal may include a random access-related signal, a reference signal (for example, a sounding reference signal (SRS) or a DM-RS), uplink data, or the like. For example, the UE may transmit a CSI report to the serving cell. The CSI report may include CSI feedback information. The CSI feedback information may include at least one of an RI, a PMI, and a CQI, based on channel estimation that is performed based on the CSI-RS received from serving cell 110 by UE 120.

Memory 320 may store basic programs for operating UE 120, application programs, and data, such as configuration information. The memory may include volatile memory, nonvolatile memory, or a combination of volatile memory and nonvolatile memory. In addition, the memory may provide stored data, according to a request from processor 330.

The processor may control overall operations of the UE. For example, the processor may transmit and receive signals through communication circuit 310. In addition, processor 330 may write data to and read data from memory 320. For example, processor 330 may store AoD information of a CSI-RS received from serving cell 110 in memory 320. As another example, processor 330 may store antenna array information of interfering cell 130 which is received from serving cell 110 through at least one of RRC signaling, a medium access control (MAC) control element (CE), and a downlink control indicator (DCI). Accordingly, the memory may include at least one processor or microprocessor or may be a portion of a processor. A portion of communication circuit 310 and processor 330 may be collectively referred to as a communication processor (CP) when the memory is a portion of a processor.

According to an embodiment of the present disclosure, the processor may further include an AoD monitoring circuit. AoD monitoring circuit 331 may perform channel estimation on a CSI-RS received by UE 120 and may extract a dominant AoD component in the received CSI-RS by performing correlation analysis on an estimated channel. For example, the processor may have already received antenna array information of the serving cell from the serving cell and may store the antenna array information in the memory. The antenna array information of the serving cell may be transferred to the UE by one of RRC signaling, an MAC CE, and a DCI. The processor may generate an array response vector of the serving cell, based on the antenna array information of the serving cell.

According to an embodiment, the processor may extract AoD values of the serving cell by performing correlation analysis on the estimated channel for the CSI-RS and the array response vector of the serving cell. As another example, the processor may have already received antenna array information of the interfering cell from the serving cell and may store the antenna array information in the memory. The antenna array information of the serving cell may be transferred to the UE by one of RRC signaling, an MAC CE, and a DCI. The processor may generate an array response vector of the interfering cell, based on the antenna array information of the interfering cell. The processor may extract AoD values of the interfering cell by performing correlation analysis on the estimated channel for the CSI-RS and the array response vector of the interfering cell.

For example, the RRC or radio resource control signaling can be used as a communication link between two stations in mobile or wireless communication. In some cases, the link may include a physical and data link layers of the open systems model for a connection. The RRC signaling may refer to a layer 3 (network layer) protocol between a user equipment and a base station. The RRC signaling includes connection establishment and release functions that configures the user and control planes according to the network status. Moreover, a channel may be used for initial access to a network when the UE switches from a radio resource control (RRC) connected idle mode to active mode, or when handing over in RRC connected mode. The channel may be used for downlink (DL) and/or uplink (UL) data arrival when the UE is in RRC idle or RRC inactive modes, and when reestablishing a connection with the network.

According to an embodiment, the processor may further include interference cancellation circuit 333. The interference cancellation circuit may identify AoD values that are not first AoD values corresponding to the serving cell. The interference cancellation circuit may estimate the remaining AoD values (i.e., except for the first AoD values) as second AoD values corresponding to a CSI-RS received from interfering cell 130. The processor may set PMI candidates based on the first AoD values corresponding to serving cell 110. For example, processor 330 may generate the PMI candidates such that PMIs corresponding to the second AoD values, which correspond to interfering cell 130, among the PMI candidates are excluded. Accordingly, UE 120 is in advance prevented from selecting a PMI for interfering cell 130.

According to an embodiment, the processor may further include handover decision circuit 335. The handover decision circuit may calculate a first channel capacity of a channel for serving cell 110 based on the first AoD values regarding the serving cell. In addition, the handover decision circuit may calculate a second channel capacity of a channel for interfering cell 130, based on the second AoD values regarding the interfering cell. Next, the handover decision circuit may transmit a handover request to serving cell 110, in response to detecting that the magnitude of the first channel capacity is less than the magnitude of the second channel capacity.

According to an embodiment, memory 320 may include an AoD storage circuit. AoD storage circuit 321 may store AoD values of CSI-RSs received by UE 120. For example, the memory may label first AoD values of serving cell 110, which are continuously monitored by the AoD monitoring circuit with the serving cell 110. Further, the memory may label the remaining AoD values except for the first AoD values among the AoD values with interfering cell 130 and may store the first AoD values and the remaining AoD values separately from each other.

According to an embodiment, memory 320 may further include an antenna array information storage circuit. Antenna array information storage circuit 323 may store the antenna array information of serving cell 110 which is obtained through RRC signaling exchange with the serving cell. In addition, the antenna array information storage circuit may obtain the antenna array information of interfering cell 130 from serving cell 110 and store the antenna array information of the interfering cell. The antenna array information storage circuit may provide the pre-stored antenna array information of the serving cell to the processor 330 when the processor performs correlation analysis on a channel estimation result. In addition, the antenna array information storage circuit may provide the antenna array information of the interfering cell and the antenna array information of the serving cell when the processor determines whether to perform handover or not.

Figure 4A:
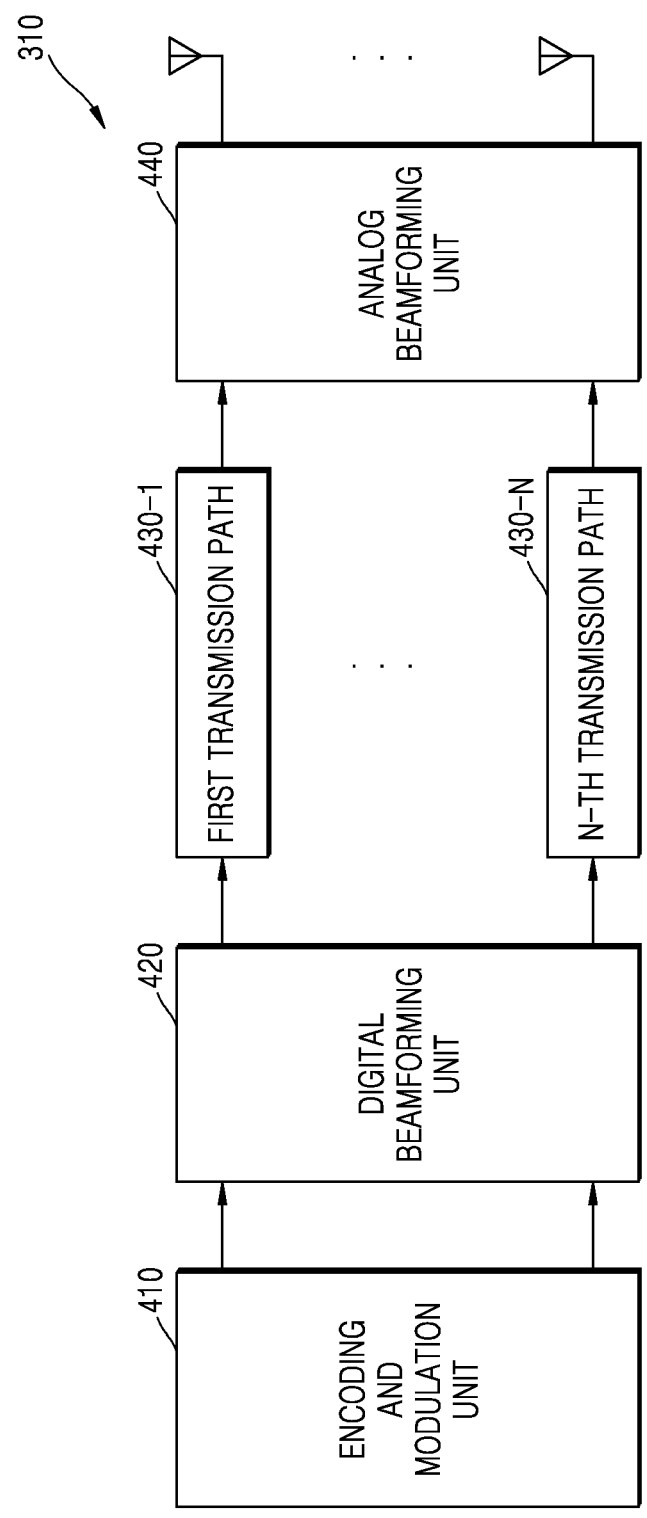
FIG. 4A illustrates an example of a detailed configuration of a communication circuit of FIG. 3.

FIG. 4A illustrates an example of a detailed configuration of the communication circuit 310 in FIG. 3.

Referring to FIG. 4A, communication circuit 310 includes an encoding and modulation unit 410, a digital beamforming unit 420, first to N-th transmission paths 430-1 to 430-N, and an analog beamforming unit 440.

Encoding and modulation unit 410 performs channel encoding. In some cases, at least one of a low density parity check (LDPC) code, a convolution code, and a polar code may be used for the channel encoding. The encoding and modulation unit generates modulation symbols by performing constellation mapping. A constellation mapping may refer to a representation of a symbol modulated by a digital modulation scheme such as quadrature amplitude modulation or phase-shift keying. The mapping provides the signal as a two-dimensional xy-plane scatter diagram in the complex plane. The angle of a point is measured counterclockwise from the horizontal axis and is representative of the phase shift of the carrier wave from a reference phase. The distance of a point from the origin represents a measure of the amplitude or power of the signal.

Digital beamforming unit 420 performs beamforming on a digital signal (for example, modulation symbols). The digital beamforming unit multiplies the modulation symbols by beamforming weights. Here, the beamforming weights are used to change the magnitude and phase of a signal and may be referred to as a "preceding matrix", a "precoder", or the like. The digital beamforming unit respectively outputs the digital-beamformed modulation symbols to the first to N-th transmission paths 430-1 to 430-N. According to the MIMO transmission scheme, the modulation symbols may be multiplexed, or the same modulation symbols may be respectively provided to the first to N-th transmission paths 430-1 to 430-N.

The first to N-th transmission paths 430-1 to 430-N respectively convert digital-beamformed digital signals into analog signals. Accordingly, each of the first to N-th transmission paths 430-1 to 430-N may include an inverse fast Fourier transform (IFFT) operation unit, a cyclic prefix (CP) insertion unit, a DAC, and an up-converter. The CP insertion unit is for the OFDM scheme and may be omitted when another physical layer scheme (for example, the filter bank multi-carrier (FBMC) scheme) is applied. That is, the first to N-th transmission paths 430-1 to 430-N respectively provide independent signal processing processes to a large number of streams generated through the digital beamforming. However, depending upon implementation methods, some of the components of the first to N-th transmission paths 430-1 to 430-N may be used.

Analog beamforming unit 440 performs beamforming on an analog signal. The analog beamforming unit multiplies analog signals by beamforming weights. Thus, the beamforming weights are used to change the magnitude and phase of a signal.

Figure 4B:
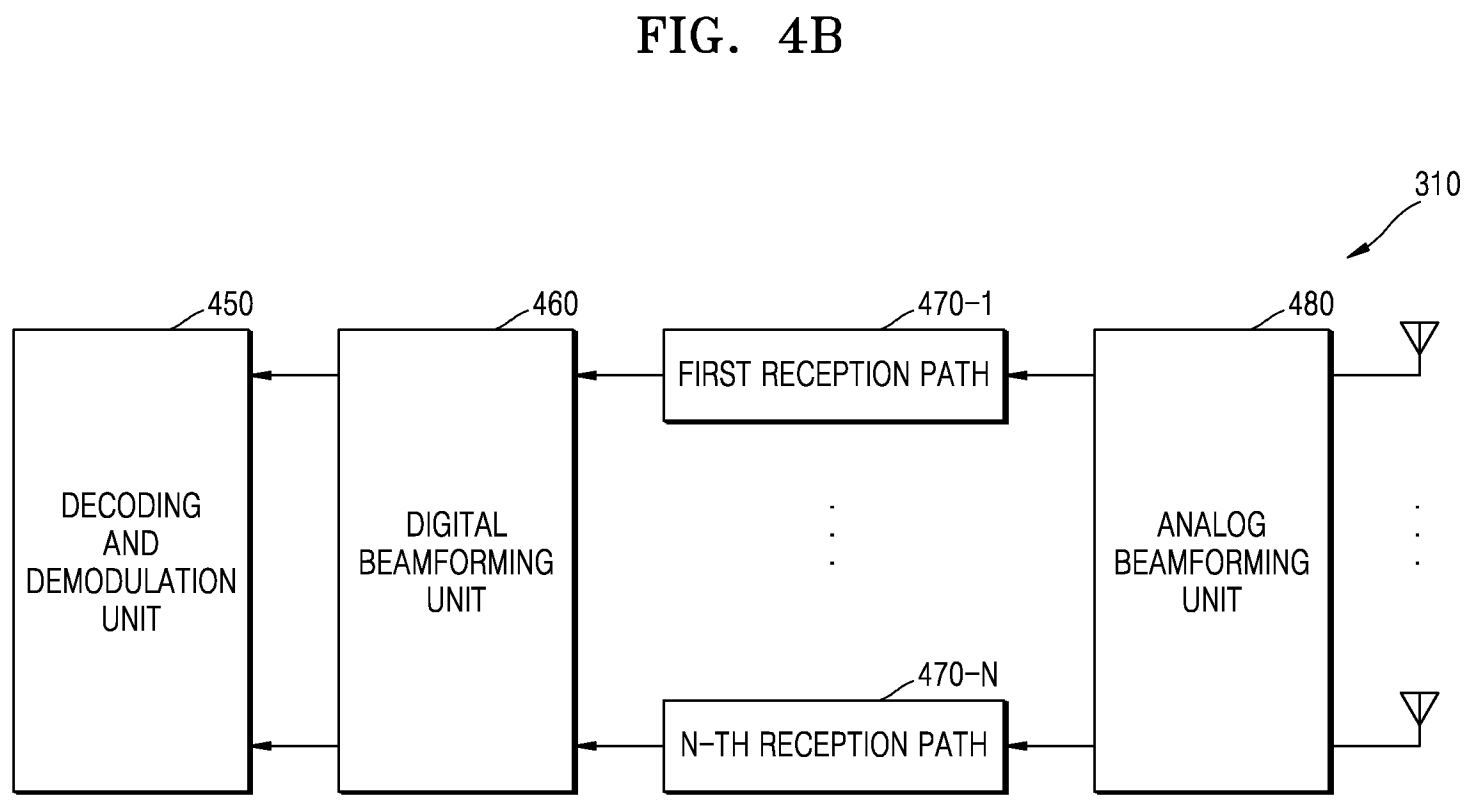

FIG. 4B illustrates an example of a detailed configuration of the communication circuit 310 in FIG. 3.

As shown in FIG. 4B, the communication circuit 310 may include a decoding and demodulation unit 450, a digital beamforming unit 460, first to N-th reception paths 470-1 to 470-N, and an analog beamforming unit 480.

The decoding and demodulation unit 450 may perform channel decoding. At least one of an LDPC code, a convolution code, and a polar code may be used for the channel decoding.

According to some embodiments, digital beamforming unit 460 and analog beamforming unit 480 may respectively correspond to digital beamforming unit 420 and analog beamforming unit 440 as described with reference to FIG. 4A. Accordingly, detailed description of digital beamforming unit 460 and analog beamforming unit 480 are omitted here for brevity.

The first to N-th reception paths 470-1 to 470-N respectively convert digital-beamformed digital signals into analog signals. To this end, each of the first to N-th reception paths 470-1 to 470-N may include a fast Fourier transform (FFT) operation unit, an ADC, a CP removal unit, a serial-to-parallel converter, and a down-converter. Each of the first to N-th reception paths 470-1 to 470-N may down-convert a received signal into a baseband frequency, generate a serial time domain baseband signal by CP removal, convert the serial time domain baseband signal into parallel time domain baseband signals, generate N parallel frequency domain signals by performing an FFT algorithm, and convert the N parallel frequency domain signals into a sequence of modulated data symbols. The first to N-th reception paths 470-1 to 470-N may respectively provide independent signal processing processes to a large number of streams generated through the digital beamforming. However, depending upon implementation methods, some of the components of the first to N-th reception paths 470-1 to 470-N may be used.

Figure 5:
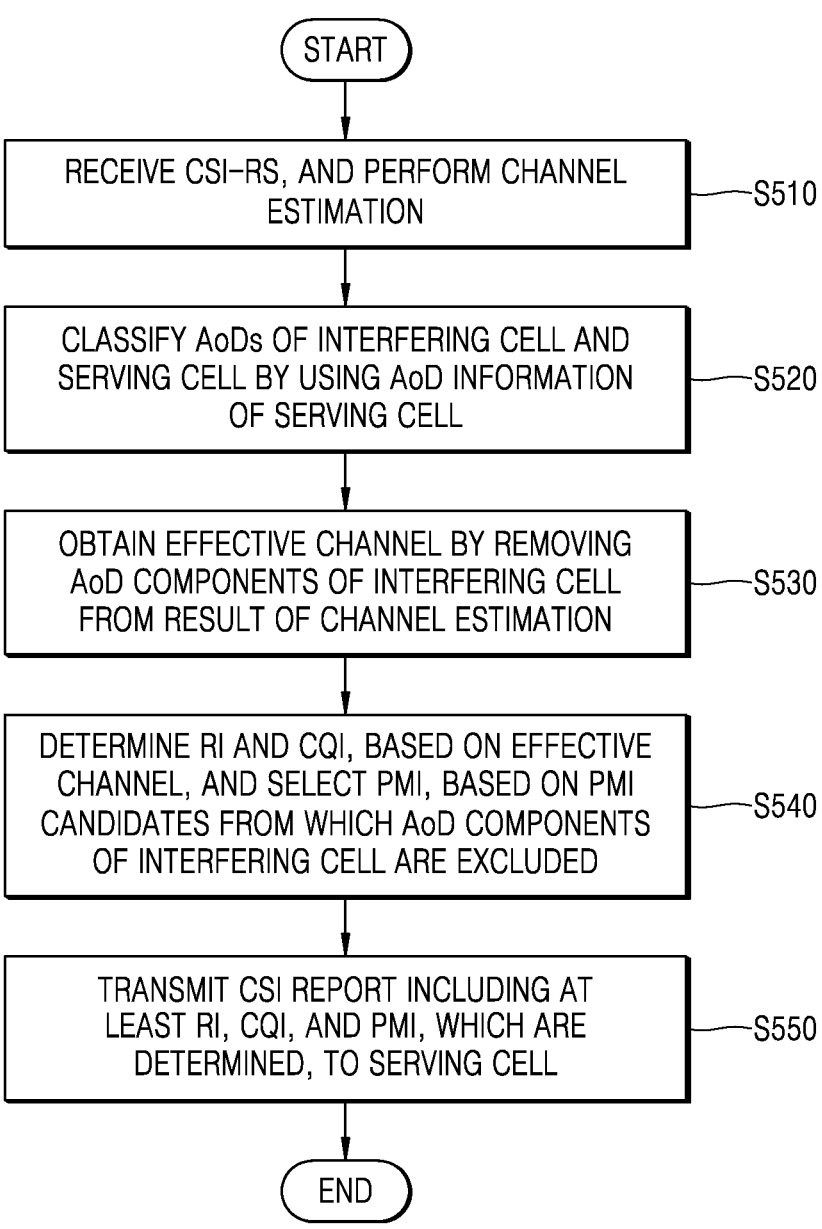
FIG. 5 is a flowchart illustrating a method of operating a user equipment (UE), according to some embodiments.

FIG. 5 is a flowchart illustrating a method of operating the UE 120, according to some embodiments.

Referring to FIG. 5, in operation S510, UE 120 may receive a CSI-RS and perform channel estimation on the received CSI-RS. As described with reference to FIG. 1, serving cell 110 may transmit a first CSI-RS and interfering cell 130 may transmit a second CSI-RS. The first CSI-RS and the second CSI-RS may be transmitted based on the same time and frequency resources. Thus, the UE may not identify the second CSI-RS as an interference signal. The CSI-RS received in operation S510 may include a first CSI-RS and a second CSI-RS respectively transmitted by serving cell 110 and interfering cell 130. Next, UE 120 may perform channel estimation on the CSI-RS.

According to an embodiment of the present disclosure, UE 120 may store in advance AoD values of serving cell 110 at a time point at which the CSI-RS of operation S510 is received. For example, in operation S510, the second CSI-RS of the interfering cell may be received at a time point at which the UE has moved to an edge region of the coverage of the serving cell. Accordingly, before the UE moves to the edge region of the coverage of the serving cell, the UE may receive the CSI-RS from the serving cell, obtain AoD information of the serving cell, and store extracted AoD values in the memory. In operation S510, a time point of receiving the CSI-RS from each of serving cell 110 and interfering cell 130 is assumed to be in an N-th period, an estimated channel may be represented by Equation 1.

$$H(n) = \sum_{\theta \in \theta_{AoD}[n]} H_{g,n}(\theta) a_t(\theta)^H \qquad \text{[Equation 1]}$$

In Equation 1, $H_{g,n}(\theta)$ is a channel gain matrix related to an AoD $\theta$, and $$a_t^S(\theta)$$

is an array response vector of the serving cell, which is related to the AoD $\theta$.

In addition, AoDs extracted from the CSI-RS received from serving cell 110 during an N−1-th period may be as provided in Equation 2.

$$\theta_{AoD}[n-1] = \{\theta_0, \ldots, \theta_{N_{path}-1}\} \qquad \text{[Equation 2]}$$

In operation S520, UE 120 may classify AoD values of interfering cell 130 and serving cell 110 by using the AoD information of serving cell 110. For example, AoDs extracted for an N-th CSI-RS may represented using Equation 3.

$$\theta_{AoD}[n] = \{\theta_0, \ldots, \theta_{N_{path}-1}, \varphi_0, \varphi_1\} \qquad \text{[Equation 3]}$$

The UE may identify AoD values which are added in the N-th period, based on Equations 2 and 3, and classify the added AoD values based on Equation 4.

$$\hat{\theta}_{AoD}[n] = \theta_{AoD}[n] - \{\varphi_0, \varphi_1\} \qquad \text{[Equation 4]}$$

For example, the UE may identify that the added AoD values for the CSI-RS received in the N-th period are not based on the first CSI-RS of the serving cell which has been continuously monitored. In some examples, the UE may identify that the added AoD values for the CSI-RS are based on the second CSI-RS of the interfering cell which is received in the edge region of the coverage.

In operation S530, UE 120 may remove AoD components of interfering cell 130 from the channel estimation result. The channel estimation result may be separated according to Equation 5 to remove an effect of interference due to the AoDs of interfering cell 130.

$$H[n] = \sum_{\theta \in \hat{\theta}_{AoD}[n]} H_{g,n}(\theta) a_t^S(\theta)^H + \sum_{\theta \in \{\varphi_0, \varphi_1\}} H_{g,n}(\theta) a_t^I(\theta)^H = \qquad \text{[Equation 5]}$$

$$H_{serv}[n] + H_{itf}[n]$$

In Equation 5, $$a_t^I(\theta)$$

is an array response vector of serving cell 110 which is related to the AoD θ. Additionally, Equation 5 may be based on the case where the UE may generate an array response vector of the interfering cell by receiving the antenna array information of the interfering cell from the serving cell. The channel estimation result may be separated according to Equations 6 and 7 when the UE does not receive the antenna array information of the interfering cell.

$$H_{serv}[n] = \sum_{\theta \in \hat{\theta}_{AoD}[n]} H_{g,n}(\theta) a_t^S(\theta)^H \qquad \text{[Equation 6]}$$

$$H_{itf}[n] = H[n] - \sum_{\theta \in \hat{\theta}_{AoD}[n]} H_{g,n}(\theta) a_t^S(\theta)^H = H[n] - H_{serv}[n] \qquad \text{[Equation 7]}$$

An effective channel for the serving cell may be obtained by generating the array response vector of the serving cell and performing channel estimation on the AoDs of the serving cell according to Equation 6 since the UE stores the antenna array information of the serving cell. In addition, according to Equation 7, an effective interference channel for the interfering cell 130 may be obtained by subtracting the effective channel for the serving cell 110, which is obtained through Equation 6, from the channel estimation result calculated in operation S510.

In operation S540, UE 120 may determine an RI and a CQI for the CSI feedback information based on the effective channel, and may select a PMI based on a plurality of PMI candidates from which the AoD components of the interfering cell 130 are excluded. The UE may determine the RI and the CQI suitable for the estimated effective channel based on the first CSI-RS received from serving cell 110. In addition, the UE 120 may select the PMI suitable for the effective channel, according to Equation 8.

$$\hat{p}[n] = \underset{p_i \in P, p_i \notin \{p_{\varphi_0}, p_{\varphi_1}\}}{\text{argmax}} Capa(H[n]; p_i) \qquad \text{[Equation 8]}$$

In Equation 8, P may refer to selectable PMI candidates. That is, the UE may set, as candidates, remaining PMI vectors except for $p_{\varphi_0}$, $p_{\varphi_1}$, which are PMI vectors in AoD directions of interfering cell 130.

According to an embodiment of the present disclosure, in operation S550, the UE may transmit a CSI report that includes at least RI, CQI, and PMI that are determined with reference to operation S540. The UE may transmit the CSI report to the serving cell.

Figure 6:
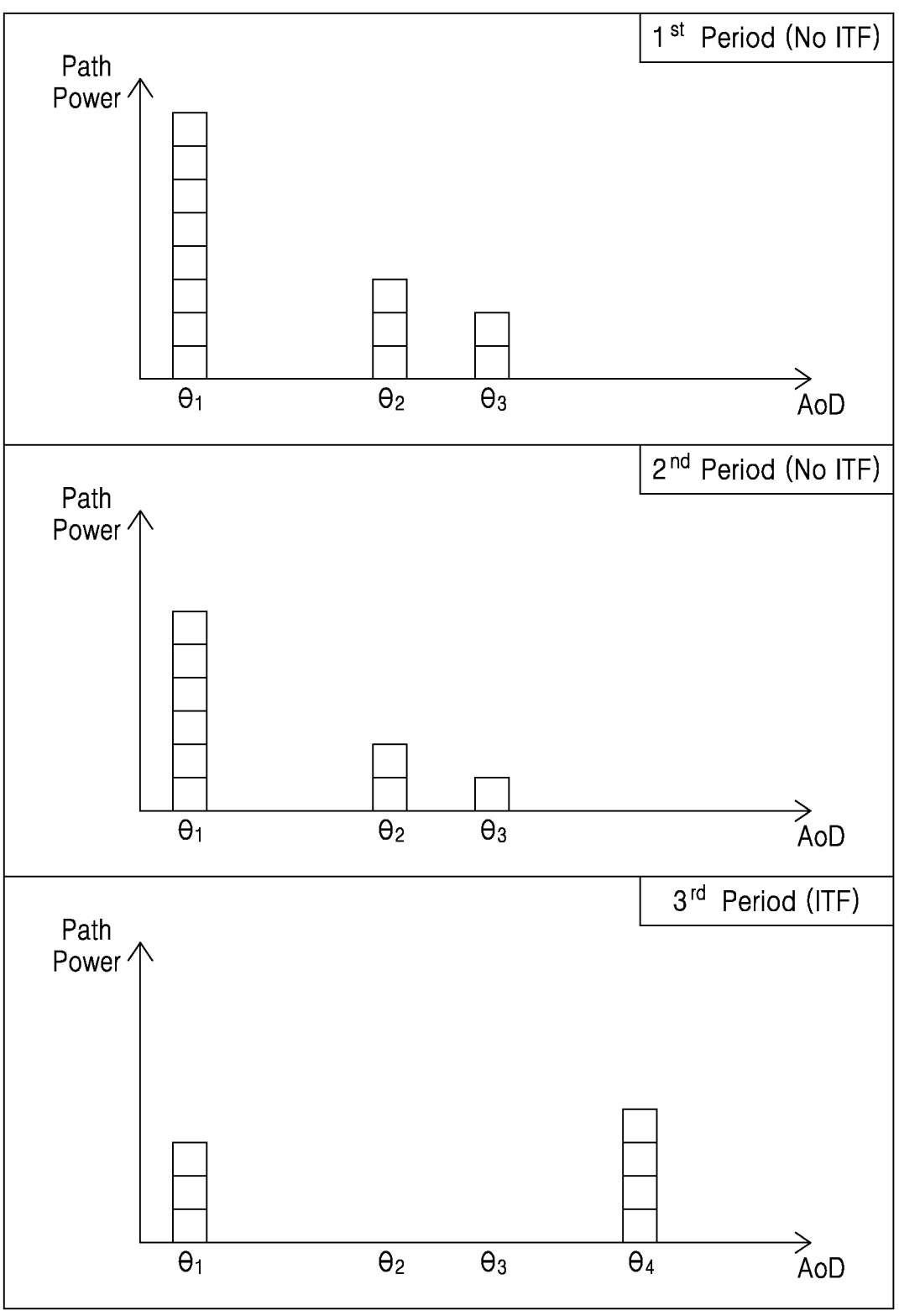
FIG. 6 illustrates a graph in which a result of channel state information reference signal (CSI-RS) channel estimation is converted into a spatial domain, according to some embodiments.

FIG. 6 illustrates a graph in which a result of CSI-RS channel estimation is converted into a spatial domain, according to some embodiments.

Referring to FIG. 6, UE 120 may perform CSI-RS-based channel estimation throughout first to third periods. Each of the first and second periods may correspond to a period of not receiving a CSI-RS from interfering cell 130. The third period may be a period in which the UE has sufficiently moved to the edge region of the coverage of the serving cell to receive the second CSI-RS from the interfering cell.

Referring to the first period, the reception power is measured to be higher at a first AoD value $\theta_1$ than the reception power measured each at a second AoD value $\theta_2$ and a third AoD value $\theta_3$. That is, reception power measured at the second and third AoD values ($\theta_2$ and $\theta_3$) are lower than the reception power measured at the first AoD value $\theta_1$. Referring to the second period, while the reception power is measured to be equal at the first to third AoD values $\theta_1$ to $\theta_3$, the magnitude of the reception power measured at each of the first to third AoD values $\theta_1$ to $\theta_3$ of the second period has decreased compared to each of the first to third AoD values $\theta_1$ to $\theta_3$ of the first period. That is, UE 120 is moving to the edge region from a central region of the coverage of serving cell 110.

Referring further to the third period, the reception power is measured to be low at the first AoD value $\theta_1$ (i.e., lower than the reception power at the first AoD value $\theta_1$ in the first and second periods) and is not received at the second AoD value $\theta_2$ and the third AoD value $\theta_3$. In addition, the reception power is measured at a fourth AoD value $\theta_4$. The UE may identify that the fourth AoD value $\theta_4$ is an AoD value in a direction of the interfering cell because the fourth AoD value $\theta_4$ is a different AoD value from the first to third AoD values $\theta_1$ to $\theta_3$ that are already obtained for the serving cell.

Figure 7:
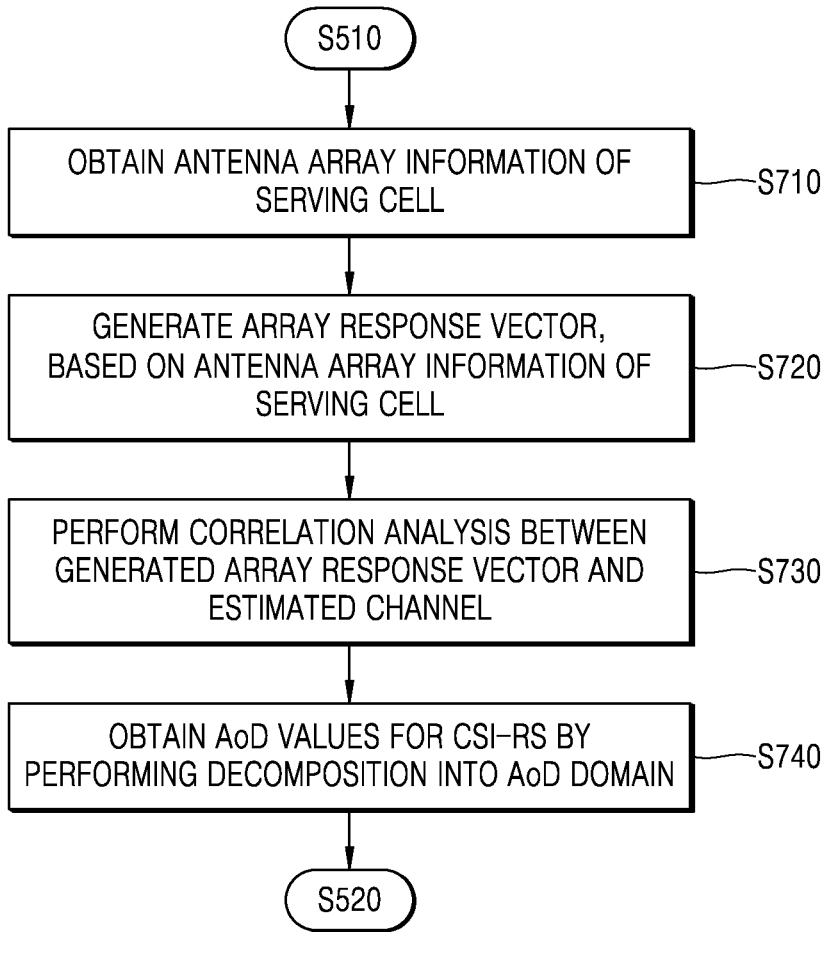
FIG. 7 is a flowchart illustrating a method of extracting angle of departure (AoD) values, according to some embodiments.

FIG. 7 is a flowchart illustrating a method of extracting AoD values, according to some embodiments.

Referring to FIG. 7, in operation S710, UE 120 may obtain antenna array information of serving cell 110. The antenna array information may include information about a panel structure, the number of operating panels, and the like of serving cell 110. For example, the UE may obtain the antenna array information of the serving cell, in response to completing an RRC connection to the serving cell 110.

According to an embodiment, the UE 120 may also receive antenna array information of interfering cell 130 from serving cell 110 through RRC signaling, based on Table 1.

TABLE 1

| CSI-ReportConfig ::= | SEQUENCE { |
|---|---|
| reportConfigId | CSI-ReportConfigId, |
| ... | |

TABLE 1-continued

| | |
|---|---|
| codebookConfig | CodebookConfig OPTIONAL, -- Need R |
| codebookConfigForInterferenceCell | CodebookConfigForInterferenceCell OPTIONAL, -- Need R |
| ... | |
| codebookConfig-r16 | CodebookConfig-r16 OPTIONAL -- Need R |
| codebookConfigForInterferenceCell-r16 | CodebookConfigForInterferenceCell-r16 OPTIONAL -- Need R |

Each of 'codebookConfigForInterferenceCell' and 'code-bookConfigForInterferenceCell-r16' in Table 1 may be in Table 2.

TABLE 2

```
CodebookConfigForInterferenceCell ::=                              SEQUENCE {
    codebookType                                                  CHOICE {
        type1                                                     SEQUENCE {
            subType                                               CHOICE {
                typeI-SinglePanel                                     SEQUENCE {
                    nrOfAntennaPorts                                  CHOICE {
                        two                                           SEQUENCE {
                            twoTX-CodebookSubsetRestriction               BIT STRING (SIZE (6))
                        },
                        moreThanTwo                                   SEQUENCE {
                            n1-n2                                     CHOICE {
                                two-one-TypeI-SinglePanel-Restriction         BIT STRING (SIZE (8)),
                                two-two-TypeI-SinglePanel-Restriction         BIT STRING (SIZE (64)),
                                four-one-TypeI-SinglePanel-Restriction        BIT STRING (SIZE (16)),
                                three-two-TypeI-SinglePanel-Restriction       BIT STRING (SIZE (96)),
                                six-one-TypeI-SinglePanel-Restriction         BIT STRING (SIZE (24)),
                                four-two-TypeI-SinglePanel-Restriction        BIT STRING (SIZE (128)),
                                eight-one-TypeI-SinglePanel-Restriction       BIT STRING (SIZE (32)),
                                four-three-TypeI-SinglePanel-Restriction      BIT STRING (SIZE (192)),
                                six-two-TypeI-SinglePanel-Restriction         BIT STRING (SIZE (192)),
                                twelve-one-TypeI-SinglePanel-Restriction      BIT STRING (SIZE (48)),
                                four-four-TypeI-SinglePanel-Restriction       BIT STRING (SIZE (256)),
                                eight-two-TypeI-SinglePanel-Restriction       BIT STRING (SIZE (256)),
                                sixteen-one-TypeI-SinglePanel-Restriction     BIT STRING (SIZE (64))
                            },
                            typeI-SinglePanel-codebookSubsetRestriction-i2        BIT STRING (SIZE (16)) OPTIONAL --
Need R
                        }
                    },
                    typeI-SinglePanel-ri-Restriction                  BIT STRING (SIZE (8))
                },
                typeI-MultiPanel                                      SEQUENCE {
                    ng-n1-n2                                          CHOICE {
                        two-two-one-TypeI-MultiPanel-Restriction          BIT STRING (SIZE (8)),
                        two-four-one-TypeI-MultiPanel-Restriction         BIT STRING (SIZE (16)),
                        four-two-one-TypeI-MultiPanel-Restriction         BIT STRING (SIZE (8)),
                        two-two-two-TypeI-MultiPanel-Restriction          BIT STRING (SIZE (64)),
                        two-eight-one-TypeI-MultiPanel-Restriction        BIT STRING (SIZE (32)),
                        four-four-one-TypeI-MultiPanel-Restriction        BIT STRING (SIZE (16)),
                        two-four-two-TypeI-MultiPanel-Restriction         BIT STRING (SIZE (128)),
                        four-two-two-TypeI-MultiPanel-Restriction         BIT STRING (SIZE (64))
                    },
                    ri-Restriction                                    BIT STRING (SIZE (4))
                }
            },
            codebookMode                                          INTEGER (1..2)
        },
        type2                                 SEQUENCE {
            subType                           CHOICE {
                typeII                        SEQUENCE {
                    n1-n2-codebookSubsetRestriction       CHOICE {
                        two-one                           BIT STRING (SIZE (16)),
                        two-two                           BIT STRING (SIZE (43)),
                        four-one                          BIT STRING (SIZE (32)),
                        three-two                         BIT STRING (SIZE (59)),
                        six-one                           BIT STRING (SIZE (48)),
                        four-two                          BIT STRING (SIZE (75)),
                        eight-one                         BIT STRING (SIZE (64)),
                        four-three                        BIT STRING (SIZE (107)),
                        six-two                           BIT STRING (SIZE (107)),
                        twelve-one                        BIT STRING (SIZE (96)),
                        four-four                         BIT STRING (SIZE (139)),
                        eight-two                         BIT STRING (SIZE (139)),
                        sixteen-one                       BIT STRING (SIZE (128))
```

TABLE 2-continued

```
        },
            typeII-RI-Restriction                           BIT STRING (SIZE (2))
        },
            typeII-PortSelection                            SEQUENCE {
                portSelectionSamplingSize                       ENUMERATED {n1, n2, n3, n4}    OPTIONAL, -- Need R
                typeII-PortSelectionRI-Restriction              BIT STRING (SIZE (2))
            }
        },
        phaseAlphabetSize                                   ENUMERATED {n4, n8},
        subbandAmplitude                                    BOOLEAN,
        numberOfBeams                                       ENUMERATED {two, three, four}
        }
    }
}
CodebookConfigForInterferenceCell-r16 ::=                SEQUENCE {
    codebookType                CHOICE {
        type2                   SEQUENCE {
            subType                 CHOICE {
                typeII-r16                  SEQUENCE {
                    n1-n2-codebookSubsetRestriction-r16             CHOICE {
                        two-one                             BIT STRING (SIZE (16)),
                        two-two                             BIT STRING (SIZE (43)),
                        four-one                            BIT STRING (SIZE (32)),
                        three-two                           BIT STRING (SIZE (59)),
                        six-one                             BIT STRING (SIZE (48)),
                        four-two                            BIT STRING (SIZE (75)),
                        eight-one                           BIT STRING (SIZE (64)),
                        four-three                          BIT STRING (SIZE (107)),
                        six-two                             BIT STRING (SIZE (107)),
                        twelve-one                          BIT STRING (SIZE (96)),
                        four-four                           BIT STRING (SIZE (139)),
                        eight-two                           BIT STRING (SIZE (139)),
                        sixteen-one                      BIT STRING (SIZE (128))
                    },
                    typeII-RI-Restriction-r16               BIT STRING (SIZE(4))
                },
                typeII-PortSelection-r16 SEQUENCE {
                    portSelectionSamplingSize-r16                   ENUMERATED {n1, n2, n3, n4},
                    typeII-PortSelectionRI-Restriction-r16 BIT STRING (SIZE (4))
                }
            },
        numberOfPMI-SubbandsPerCQI-Subband-r16 INTEGER (1..2),
        paramCombination-r16    INTEGER (1..8)
        }
    }
}
```

In operation S720, UE 120 may generate an array response vector based on the antenna array information of serving cell 110. The UE may generate array response vectors for respective AoD values in advance.

In operation S730, UE 120 may perform correlation analysis on a plurality of array response vectors, which are generated for the respective AoD values, and the channel estimation result obtained in operation S510 (as described with reference to FIG. 5). The UE may repeatedly determine a degree of correlation between the channel estimation result and each of the plurality of array response vectors by performing the correlation analysis.

In operation S740, UE 120 may obtain AoD values for a CSI-RS by performing decomposition into an AoD domain. For example, the UE may identify that the serving cell is located in a direction indicated by an AoD value having a high degree of correlation as a result of repeatedly performing the correlation analysis on the plurality of AoD values. As described with reference to FIG. 6, the received CSI-RS has been domain-converted into an AoD value on an X-axis according to the magnitude of reception power on a Y-axis. According to the present invention, the UE 120 may be further based on PMI basis space. The PMI basis are configuring the PMI codebook. The UE 120 may receive codebook information from the serving cell through radio resource control (RRC) signaling. The UE 120 may generate bases included in a precoding matrix indicator (PMI) codebook based on the codebook information. The UE 120 may perform correlation analysis between a result of channel estimation for the received CSI-RS and the generated bases, and may determine a basis having a highest degree of correlation based on the correlation analysis as PMI basis for the serving cell.

Accordingly, a wireless communication system is provided that receives a first CSI-RS from a serving cell and a second CSI-RS from an interfering cell. The processor computes first AoD values based on the first CSI-RS and second AoD values based on the second CSI-RS. The processor determines that the second AoD values correspond to the interfering cell. Additionally, the processor communicates with the serving cell based on the first AoD values and a determination that the second AoD values correspond to the interfering cell.

Figure 8:
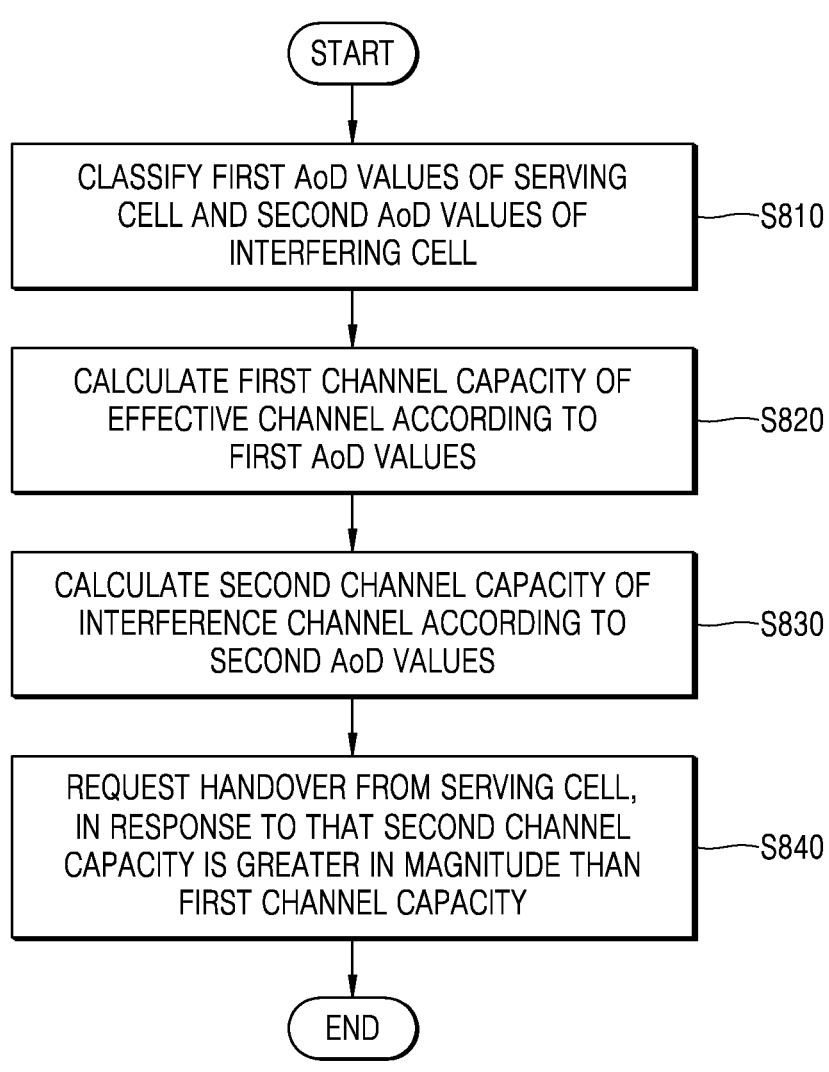
FIG. 8 is a flowchart illustrating a method determining performance of handover, according to some embodiments.

FIG. 8 is a flowchart illustrating a method of determining whether to perform handover, according to some embodiments.

Referring to FIG. 8, in operation S810, first AoD values of serving cell 110 and second AoD values of interfering cell 130 may be classified. For example, the UE may store AoD values monitored for the serving cell in the memory. The UE may determine, as being the second AoD values of the interfering cell, $\varphi_0$, $\varphi_1$, which are not pre-stored AoD values from among $\theta_{AoD}[n]=\{\theta_0, \ldots, \theta_{N_{path}}-1, (\varphi_0, \varphi_1)\}$ obtained for a current CSI-RS.

In operation S820, the UE may calculate a first channel capacity of an effective channel according to the first AoD values. The first channel capacity may be calculated according to Equation 9.

$$Capa(H_{serv}[n]; p_{serv}) = \log_2|I + snrHpp^H H^H| \qquad \text{[Equation 9]}$$

In Equation 9, $p_{serv}$ is a PMI vector for the first AoD values corresponding to the serving cell, and $H_{serv}[n]$ may refer to an effective channel between the UE and the serving cell.

In operation S830, UE 120 may calculate a second channel capacity of an interference channel according to the second AoD values. The second channel capacity may be Capa($H_{itf}[n]$; $p_{itf}$), where $p_{itf}$ is a PMI vector for the second AoD values corresponding to serving cell 110 and $H_{itf}[n]$ may refer to an interference channel between UE 120 and interfering cell 130.

In operation S840, UE 120 may request a handover from serving cell 110, in response to detecting that the second channel capacity is greater in magnitude than the first channel capacity. For example, when the second channel capacity is greater than the first channel capacity, although the UE maintains RRC connection to the serving cell, the UE may be closer to the interfering cell and may have a better channel state with respect to the interfering cell. Therefore, the UE may request the serving cell to perform handover to the interfering cell.

A method of operating a wireless communication device comprises: receiving a first channel state information reference signal (CSI-RS) from a serving cell and a second CSI-RS from an interfering cell, computing first angle of departure (AoD) values based on the first CSI-RS and second AoD values based on the second CSI-RS, determining that the second AoD values correspond to the interfering cell, and communicating with the serving cell based on the first AoD values and the determination that the second AoD values correspond to the interfering cell.

According to an aspect of the present disclosure, the method further comprises computing angle of departure (AoD) values based on an estimated channel and antenna array information.

According to an aspect of the present disclosure, the method further comprises classifying the AoD values into first AoD values corresponding to the serving cell and second AoD values corresponding to the interfering cell that is adjacent to the serving cell.

According to an aspect of the present disclosure, wherein performing CSI-RS-based channel estimation based on a first through third periods, wherein the first and second periods correspond to not receiving a CSI-RS from interfering cell and the third period corresponds to receiving the second CSI-RS from the interfering cell.

According to an aspect of the present disclosure, the method further comprises measuring a reception power at a first AoD value, a second AoD value, and a third AoD value in the first and second periods.

According to an aspect of the present disclosure, the method further comprises measuring a reception power at a fourth AoD value in the third period.

Figure 9:
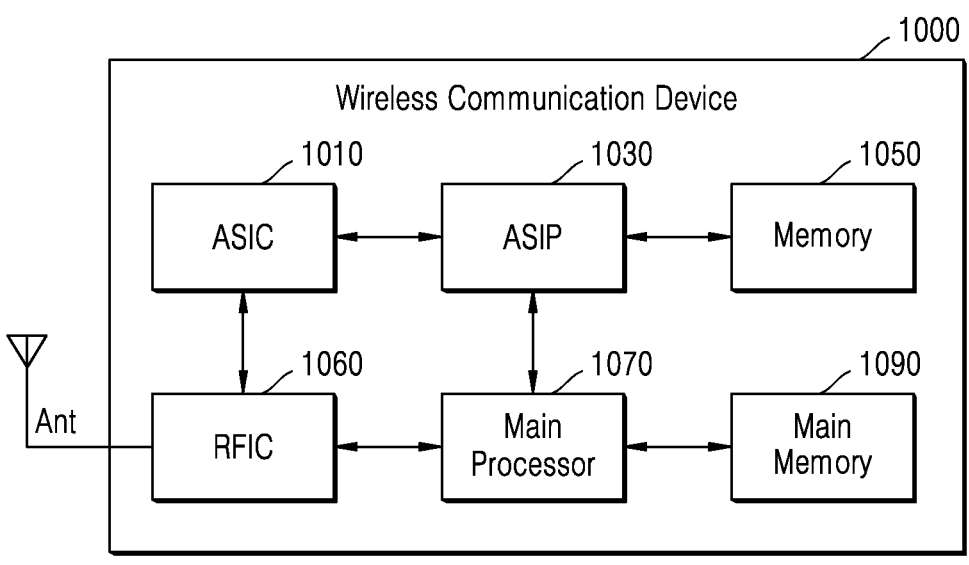
FIG. 9 is a block diagram of a wireless communication device according to some embodiments.

FIG. 9 is a block diagram of a wireless communication device according to some embodiments.

Referring to FIG. 9, wireless communication device 1000 may include a modem (not shown) and radio frequency integrated circuit (RFIC) 1060. The modem may include application-specific integrated circuit (ASIC) 1010, application-specific instruction set processor (ASIP) 1030, memory 1050, main processor 1070, and main memory 1090. The description for the wireless communication device 1000 of FIG. 9 may correspond to the description of UE 120 of FIG. 1 and is omitted here for brevity.

RFIC 1060 may be connected to an antenna Ant and thus receive a signal from or transmit a signal to the outside of the wireless communication device 1000 by using a wireless communication network. ASIP 1030, which is an integrated circuit customized for a specific purpose, may support a dedicated instruction set for a specific application and execute instructions included in the instruction set. Memory 1050 may communicate with the ASIP and, as a non-transitory storage device, may store a plurality of instructions executed by the ASIP. For example, the memory may include any type of memory accessible by the ASIP, such as, as non-limiting examples, random access memory (RAM), read-only memory (ROM), tape, a magnetic disk, an optical disk, volatile memory, nonvolatile memory, and a combination thereof.

Main processor 1070 may control the wireless communication device 1000 by executing a plurality of instructions. For example, the main processor may control the ASIC and the ASIP and may process data received through a wireless communication network or process an input to the wireless communication device 1000 from a user. For example, the main processor may track AoD values of the serving cell and, in response to that AoD values for a received CSI-RS include different AoD values from the tracked AoD values, may determine an RI, a CQI, and a PMI by calculating an effective channel while the different AoD values are excluded.

Main memory 1090 may communicate with main processor 1070 and, as a non-transitory storage device, may store the plurality of instructions executed by the main processor. For example, the main memory may include any type of memory accessible by the main processor, such as, as non-limiting examples, RAM, ROM, tape, a magnetic disk, an optical disk, volatile memory, nonvolatile memory, and a combination thereof.

While the inventive concept has been particularly shown and described with reference to embodiments thereof, it will be understood that various changes in form and details may be made therein without departing from the spirit and scope of the following claims.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A wireless communication device comprising:

a communication circuit configured to receive a channel state information reference signal (CSI-RS);

a processor comprising an angle of departure (AoD) monitoring circuit and an interference cancellation circuit, wherein:

the AoD monitoring circuit is configured to extract AoD values corresponding to the CSI-RS, and the interference cancellation circuit is configured to cancel second AoD values that correspond to an interfering cell adjacent to a serving cell, other than first AoD values corresponding to the serving cell among the AoD values; and a memory storing the first AoD values corresponding to the serving cell and antenna array information of the serving cell, wherein the antenna array information of the serving cell is obtained based on at least one of a medium access control (MAC) control element (CE) and downlink control information (DCI), wherein the communication circuit is further configured to receive one or more CSI-RS in response to the wireless communication device enters an edge region of the serving cell, and wherein the edge region of the serving cell covers at least a part of a coverage of the interfering cell.

2. The wireless communication device of claim 1, wherein the antenna array information of the serving cell is further obtained based on radio resource control (RRC) signaling.

3. The wireless communication device of claim 1, wherein the processor is configured to:

estimate an effective channel based on the first AoD values corresponding to the serving cell; and determine a rank indicator (RI) and a channel quality indicator (CQI) based on the effective channel.

4. The wireless communication device of claim 1, wherein the processor is configured to:

generate precoding matrix indicator (PMI) candidates based on remaining AoD values except for the second AoD values corresponding to the interfering cell among the AoD values corresponding to the CSI-RS; and select one PMI based on the PMI candidates.

5. The wireless communication device of claim 1, wherein the processor further comprises a handover decision circuit configured to:

calculate a first channel capacity of an effective channel that is estimated based on the first AoD values corresponding to the serving cell;

calculate a second channel capacity of an interference channel that is estimated based on the second AoD values corresponding to the interfering cell; and transmit a handover request to the serving cell in response to that the second channel capacity is greater than the first channel capacity.

6. The wireless communication device of claim 1, wherein the processor is configured to:

generate a plurality of array response vectors respectively corresponding to a plurality of AoD values based on the antenna array information of the serving cell;

perform correlation analysis between a result of channel estimation for the CSI-RS and the plurality of array response vectors;

determine an AoD value having a highest degree of correlation based on the correlation analysis; and select the AoD value for the serving cell.

7. The wireless communication device of claim 1, wherein the processor is configured to:

receive codebook information from the serving cell through radio resource control (RRC) signaling;

generate bases included in a precoding matrix indicator (PMI) codebook based on the codebook information;

perform correlation analysis between a result of channel estimation for the CSI-RS and the bases; and determine a basis having a highest degree of correlation based on the correlation analysis as PMI basis for the serving cell.

8. A method of operating a wireless communication device, the method comprising:

receiving a first channel state information reference signal (CSI-RS);

receiving a second CSI-RS in response to the wireless communication device enters an edge region of a serving cell;

extracting angle of departure (AoD) values corresponding to the first CSI-RS and the second CSI-RS;

classifying the AoD values into first AoD values corresponding to the serving cell and second AoD values corresponding to an interfering cell that is adjacent to the serving cell; and receiving antenna array information of the serving cell from the serving cell, wherein the antenna array information of the serving cell is obtained based on at least one of a medium access control (MAC) control element (CE) and downlink control information (DCI), wherein the edge region of the serving cell covers at least a part of a coverage of the interfering cell.

9. The method of claim 8, further comprising:

receiving the antenna array information of the serving cell from the serving cell, wherein the antenna array information of the serving cell is further obtained based on radio resource control (RRC) signaling.

10. The method of claim 8, further comprising:

estimating an effective channel based on the first AoD values corresponding to the serving cell;

determining a rank indicator (RI) and a channel quality indicator (CQI) based on the effective channel; and transmitting a CSI report comprising the RI and the CQI to the serving cell.

11. The method of claim 8, further comprising:

generating precoding matrix indicator (PMI) candidates based on remaining AoD values other than the second AoD values among the AoD values corresponding to the first CSI-RS;

selecting a PMI based on the PMI candidates; and transmitting a CSI report comprising the PMI to the serving cell.

12. The method of claim 8, further comprising:

calculating a first channel capacity of an effective channel, wherein the first channel capacity is estimated based on the first AoD values corresponding to the serving cell;

calculating a second channel capacity of an interference channel, wherein the second channel capacity is estimated based on the second AoD values corresponding to the interfering cell; and transmitting a handover request to the serving cell in response to that the second channel capacity is greater than the first channel capacity.

13. The method of claim 8, wherein the extracting of the AoD values corresponding to the CSI-RS comprises:

generating a plurality of array response vectors respectively corresponding to a plurality of AoD values based on antenna array information of the serving cell;

performing correlation analysis between a result of channel estimation for the CSI-RS and the plurality of array response vectors;

determining an AoD value having a highest degree of correlation based on the correlation analysis; and selecting the AoD value with the highest degree of correlation as an AoD value for the serving cell.

14. The method of claim 8, further comprising:

receiving codebook information from the serving cell through radio resource control (RRC) signaling;

generating bases of a precoding matrix indicator (PMI) codebook based on the codebook information;

performing correlation analysis between a result of channel estimation for the first CSI-RS and the bases; and determining a basis having a highest degree of correlation based on the correlation analysis as a PMI basis for the serving cell.

15. A wireless communication system comprising:

a serving cell configured to transmit a first channel state information reference signal (CSI-RS) and antenna array information;

an interfering cell configured to transmit a second CSI-RS; and a wireless communication device configured to receive the first CSI-RS and the second CSI-RS, wherein the wireless communication device comprises:

a communication circuit configured to receive a CSI-RS comprising the first CSI-RS and the second CSI-RS;

a processor configured to extract AoD values corresponding to the CSI-RS and classify the AoD values into first AoD values corresponding to the serving cell and second AoD values corresponding to the interfering cell; and a memory storing the first AoD values corresponding to the serving cell and the antenna array information of the serving cell, wherein the antenna array information of the serving cell is obtained based on at least one of a medium access control (MAC) control element (CE) and downlink control information (DCI), wherein the communication circuit is further configured to receive the second CSI-RS in response to the wireless communication device enters an edge region of the serving cell, and

wherein the edge region of the serving cell covers at least a part of a coverage of the interfering cell.

16. The wireless communication system of claim 15, wherein the wireless communication device is further configured to:

estimate an effective channel based on the first AoD values corresponding to the serving cell; and determine a rank indicator (RI) and a channel quality indicator (CQI) based on the effective channel.

17. The wireless communication system of claim 15, wherein the wireless communication device is further configured to: generate precoding matrix indicator (PMI) candidates based on remaining AoD values except for the second AoD values corresponding to the interfering cell among the AoD values corresponding to the CSI-RS; and select one PMI based on the PMI candidates.

18. The wireless communication system of claim 15, wherein the wireless communication device is further configured to:

calculate a first channel capacity of an effective channel, wherein the first channel capacity is estimated based on the first AoD values corresponding to the serving cell;

calculate a second channel capacity of an interference channel, wherein the second channel capacity is estimated based on the second AoD values corresponding to the interfering cell; and transmit a handover request to the serving cell in response to that the second channel capacity is greater than the first channel capacity.

19. The wireless communication system of claim 17, wherein the processor is further configured to:

generate a plurality of array response vectors respectively corresponding to a plurality of AoD values based on the antenna array information of the serving cell;

perform correlation analysis between a result of channel estimation for the CSI-RS and the plurality of array response vectors; and determine an AoD value having a highest degree of correlation based on the correlation analysis to be an AoD value for the serving cell.

20. The wireless communication system of claim 15, wherein the antenna array information is further transmitted to the wireless communication device based on radio resource control (RRC) signaling.

* * * * *